United States Patent Office 3,632,709
Patented Jan. 4, 1972

3,632,709
MAKING ALUMINA FIBERS FROM A MIXTURE OF ALUMINA SOL AND HEXAMETHYLENE-TETRAMINE
John C. Hayes, Palatine, and Jay E. Sobel, Des Plaines, Ill., assignors to Universal Oil Products Company, Des Plaines, Ill.
No Drawing. Filed Dec. 27, 1968, Ser. No. 787,605
Int. Cl. C04b 35/10, 31/04
U.S. Cl. 264—63
4 Claims

ABSTRACT OF THE DISCLOSURE

A method of preparing flexible, refractory inorganic fibers. A refractory inorganic oxide sol, e.g., an alumina sol, is admixed with a soluble organic amine, suitably hexamethylenetetramine, and drawn into fibers. The fibers are thereafter calcined at 300–1000° C. to produce porous flexible fibers of high surface area.

The hexamethylenetetramine has the effect of inhibiting crystal growth of the gamma-alumina during the fiber calcining step.

BACKGROUND OF THE INVENTION

This invention relates to a method of preparing refractory inorganic oxide fibers. Such fibers have heretofore been recognized as insulators against heat and sound, and as fillers, stiffening agents or tensile and abrasion reinforcing agents for plastics, films, and the like. The refractory inorganic oxide fibers of this invention are flexible fibers capable of being formed into multiple filament yarns and flexible textiles and mats. They are characterized as porous fibers of high surface area and are advantageously employed as a catalyst, or a catalyst support, for a variety of reactions including hydrocarbon conversion reactions and, in particular the treatment of combustible waste gases prior to discharge of the same into the atmosphere. For example, the fibers of this invention are particularly adapted for incorporation in a catalytic muffler as a catalyst or component thereof to effect the elimination of products of incomplete combustion from hydrocarbonaceous waste gases emanating from an internal combustion engine prior to discharge to the atmosphere.

It is an object of this invention to provide a novel refractory inorganic oxide fiber material, and a method of preparation. It is a further object to present a novel method of preparation whereby porous flexible fibers of high surface area, capable of functioning as a catalyst or a component thereof, are produced.

SUMMARY OF THE INVENTION

In one of its broad aspects, the present invention embodies a method of preparing porous flexible refractory inorganic oxide fibers which comprises forming a substantially liquid phase reaction mixture comprising a refractory inorganic oxide sol and a soluble organic amine, concentrating said reaction mixture while maintaining a substantially liquid phase, fiberizing said concentrated reaction mixture and calcining the resulting fibers at a temperature of from about 300° to about 1000° C. Other objects and embodiments of this invention will become apparent in the following detailed specification.

The refractory inorganic oxide sols treated in accordance with the method of this invention include gelable hydrous sols, for example alumina sol, chromia sol, zirconia sol, silica sol, magnesia sol, thoria sol, and the like, as well as combinations thereof, such as alumina-chromia sols, alumina-zirconia sols, etc., to form the corresponding refractory inorganic oxide fiber. Said sols include those sols resulting from hydrolysis and concentration of aqueous solutions of one or more appropriate metals salts, such as zirconium acetate, whereby a colloidal dispersion, stable in the remaining liquid, is formed. For purpose of illustration, the method of this invention will be described with reference to the preparation of alumina fibers with the understanding that the method is also applicable to the preparation of fibers comprising other inorganic oxides or combinations thereof.

The alumina sols herein contemplated can be prepared by the hydrolysis of a suitable acid salt of aluminum such as aluminum chloride, aluminum sulphate, aluminum nitrate, aluminum acetate, etc., in aqueous solution, and treating said solution at conditions to form an acid anion deficient solution or sol. Reduction in the concentration of the acidic anion formed by the hydrolysis reaction may be accomplished in any conventional or otherwise convenient manner. Thus, the acidic anion concentration can be reduced utilizing aluminum metal as a neutralizing agent. In this case, the salt of neutralization is an aluminum salt subject to hydrolysis and ultimate sol formation. In some cases, as in the case of aluminum acetate, when the acid anion is sufficiently volatile, the desired acid anion deficient solution or sol may be prepared simply by heating. Another method of producing a suitable alumina sol is in the electrolysis of an aluminum salt solution, such as an aqueous aluminum chloride solution, in an electrolytic cell having a porous partition between anode and cathode whereby an anion deficient aluminum salt solution, or sol, is recovered from the cathode compartment.

Preferably, the sol is an aluminum chloride sol prepared, for example, by digesting aluminum pellets or slugs in aqueous hydrochloric acid and/or aluminum chloride solution—usually at about reflux temperature. Aluminum chloride sols are preferably prepared to contain aluminum in from about a 1:1 to about a 2:1 atomic ratio with the chloride anion.

The inorganic oxide hydrosol is, pursuant to the method of this invention, admixed with a soluble organic amine to form a substantially liquid phase reaction mixture at fiberizing conditions. The selected organic amine must be substantially stable at fiberizing conditions, i.e., a temperature of from about 5° to about 90° C. Suitable organic amines thus include n-butylamine, n-amylamine, sec-amylamine, t-amylamine, ethylenediamine, trimethylenediamine, tetramethylenediamine, pentamethylenediamine, hexamethylenediamine, hexamethylenetetramine, benzylamine, benzenetriamine, phenylenediamine, pyrolidene, urea, etc., and also alkanolamines, such as ethanolamine, diethanolamine, triethanolamine, 2 - amino - 2-methylpropanol, 2 - amino-butanol, and the like. The reaction mixture is suitably prepared to contain sufficient organic amine to effect from about 5% to about 50% neutralization of the acid anion retained in the sol. It is preferred to add the selected organic amine as an aqueous solution to the sol to obviate localized gelation. As will hereinafter appear, the organic amine, which is preferably hexamethylenetetramine, has the effect of inhibiting crystallite growth during fiber formation and produces a flexible, resilient, porous fiber.

The reaction mixture or sol thus prepared is concentrated to a tacky consistency while maintaining a substantially liquid phase. The reaction mixture is suitably reduced to the desired consistency by the evaporation of water therefrom, suitably by simple evaporation upon standing in an open vessel, but more conveniently by treating in a vacuum evaporator at ambient temperature, a tacky consistency being achieved at a viscosity of from about 1 to about 1000 poises. A further evaporation of water and initial gelation of the sol is effected as the sol is being formed into stable fibers in an atmosphere of controlled temperature and humidity.

Fiberizing conditions relate principally to the temperature and himidity of the environment in which the fibers are formed. The relatively large surface area presented by the fibers in the process of being formed permits a relatively rapid evaporation of moisture therefrom with the formation of a stable fibrous hydrogel, provided that the moisture content of the environment is sufficiently low. If however, the moisture content is too high, the desired rapid evaporation does not occur and the fibrous hydrosol may in effect absorb sufficient moisture to collapse in a formless mass. The fiberizing environment should comprise a relative humidity of less than about 80%, and preferably from about 30% to about 60%. The temperature of the fiberizing environment is somewhat less critical and may be from about 5° to about 90° C., and preferably from about 25° to about 90° C. The described sol may be processed or formed into fibers by a slow and constant injection of the sol into the atmosphere of controlled humidity and temperature, drawing the injected sol into fibers and subjecting the fibers thus formed to a specific heat treatment to yield a porous, flexible product. The sol may be extruded or pulled downwardly through a perforated plate comprising one or more relatively large orifice openings, the resulting fibers being rapidly attenuated using the material being extruded or pulled through the perforated plate as a constant feed. In any case, the sol is preferably drawn or extruded into fibers with a maximum diameter of less than about 20 microns for improved flexibility.

The fibers thus formed are thereafter calcined at a temperature of from about 300° to about 1000° C. to yield a flexible fiber product. As will be apparent with reference to the appended examples, the incorporation of an organic amine, such as hexamethylenetetramine, in the sol subsequently processed into fibers, results in a yield of porous, flexible fibers which are otherwise recovered as a friable product upon calcination.

EXAMPLE I

An alumina sol was prepared by digesting an excess of aluminum metal in aqueous hydrochloric acid under reflux conditions (98°–115° C.). The aluminum/chloride ratio of the sol was controlled by monitoring the amount of hydrogen liberated during the reaction. The resulting sol analyzed 12.03% aluminum and 10.38% chloride for an aluminum/chloride ratio of 1.16. The specific gravity of the sol was 1.3455.

To about 3 liters of this sol was added, with stirring, 714 milliliters of a 28% aqueous hexamethylenetetramine solution—sufficient to neutralize about 50% of the chloride anion. The resulting mixture was thereafter concentrated by allowing about 855 milliliters of water to evaporate therefrom at about room temperature. The concentrated mixture analyzed 12.38% aluminum, 10.73% chloride and 50.8% total solids at 105° F. The specific gravity of the concentrated mixture was 1.383 and the kinematic viscosity 26.5 centistokes.

The concentrated mixture was drawn into fibers in a closed chamber and in an atmosphere characterized by a relative humidity of 45–55% and a temperature of 20–30° C. The fibers were collected and calcined in air at about 550° C. for approximately 15 minutes. Optical examination of the calcined fibers indicated a clear, transparent fiber. The mean diameter of the fibers was 10.6 microns. The fibers were quite flexible and resilient and showed little tendency toward attrition. X-ray examination of the fibers indicated an over-all gamma-alumina pattern but of such fine crystallite size that the material could be considered amorphous. Measurement of surface properties by nitrogen absorption indicated a surface area of 230 square meters per gram, a pore volume of 0.21 cubic centimeter per gram and a pore diameter of 37 A.

EXAMPLE II

Alumina fibers were prepared substantially as described in Example I with the exception that the aqueous hexamethylenetetramine was omitted from the sol formulation. After the calcination treatment, the fibers were opaque and friable and crumbled readily upon handling. The mean diameter of the fibers was 13.5 microns. X-ray examination indicated that the fibers were of gamma-alumina of large crystallite size. Thus, the addition of hexamethylenetetramine to the sol formulation has the effect of retarding crystalline growth and results in a porous flexible fiber which is not dependent upon high temperature sintering to acquire strength.

EXAMPLE III

A chromia-alumina sol was prepared by digesting aluminum metal in aqueous chromium chloride solution. The sol analyzed 10.06% aluminum, 2.83% chromium and 10.15% chloride. The specific gravity measured 1.349.

To 64.3 grams of the sol was added 11.0 milliliters of a 28% aqueous hexamethylenetetramine solution. The mixture was then concentrated and drawn into fibers substantially as in Example I and under the same conditions of temperature and humidity. After calcination in air at 550° C. for about 1 hour, the fibers were flexible and resilient with a mean diameter of 12.1 microns. The fibers were greenish-gold in color. Nitrogen absorption data indicated the fibers were porous with a surface area of about 300 square meters per gram, a pore volume of 0.32 cubic centimeter per gram and a pore diameter of 44 A.

We claim as our invention:

1. A method of preparing porous, flexible alumina fibers which comprises forming a substantially liquid phase reaction mixture consisting essentially of (1) an acid anion-containing alumina sol and (2) a sufficient amount of hexamethylenetetramine to effect from about 5% to about 50% neutralization of the acid anion in the sol, concentrating said reaction mixture to a tacky consistency characterized by a viscosity of from about 1 to about 1000 poises, fiberizing said reaction mixture in an atmosphere characterized by a relative humidity of less than about 80% and a temperature of from about 5° to about 90° C., and calcining the resulting fibers in air at a temperature of from about 300° to about 1000° C.

2. The method of claim 1 further characterized in that said reaction mixture is fiberized in an atmosphere characterized by a relative humidity of from about 30% to about 60% and a temperature of from about 25° to about 90° C.

3. The method of claim 1 further characterized in that said alumina sol is an aluminum chloride sol.

4. The method of claim 3 further characterized in that said aluminum chloride sol is characterized by an aluminum/chloride ratio of from about 1:1 to about 2:1.

(References on following page)

References Cited

UNITED STATES PATENTS

| | | | |
|---|---|---|---|
| 2,886,404 | 5/1959 | Teja | 18—54 IFD |
| 2,915,475 | 12/1959 | Bugosh | 252—313 IFD |
| 3,082,051 | 3/1963 | Wainer et al. | 18—48 IFD |
| 3,082,099 | 3/1963 | Beasley et al. | 106—39 IFD |
| 3,096,144 | 7/1963 | Wainer et al. | 18—54 IFD |
| 3,110,545 | 11/1963 | Beasley et al. | 18—54 IFD |
| 3,180,741 | 4/1965 | Wainer et al. | 106—39 IFD |
| 3,270,109 | 8/1966 | Kelsey | 264—178 IFD |
| 3,271,173 | 9/1966 | Lockhart et al. | 106—65 IFD |
| 3,311,481 | 3/1967 | Sterry et al. | 106—57 IFD |
| 3,311,689 | 3/1967 | Kelsey | 264—210 IFD |
| 3,397,257 | 8/1968 | Brambilla | 264—.5 IFD |
| 3,503,765 | 3/1970 | Blaze, Jr. | 106—65 |
| 3,507,944 | 4/1970 | Moore, Jr. | 264—63 |
| 3,529,044 | 9/1970 | Santangelo | 264—29 |

FOREIGN PATENTS

| | | | |
|---|---|---|---|
| 682,468 | 3/1964 | Canada | 264—56 |
| 666,626 | 7/1963 | Canada | 264—63 |

JULIUS FROME, Primary Examiner

J. H. MILLER, Assistant Examiner

U.S. Cl. X.R.

106—65; 264—204, Dig. 19